Patented Feb. 12, 1924.

1,483,854

UNITED STATES PATENT OFFICE.

JULES H. STEAN, OF WORCESTER, MASSACHUSETTS, ASSIGNOR TO NORTON COMPANY, OF WORCESTER, MASSACHUSETTS, A CORPORATION OF MASSACHUSETTS.

ABRASIVE STONE.

No Drawing. Application filed February 26, 1919. Serial No. 279,225.

*To all whom it may concern:*

Be it known that I, JULES H. STEAN, a citizen of France, residing at Worcester, in the county of Worcester and State of Massachusetts, have invented certain new and useful Improvements in Abrasive Stones, of which the following is a full, clear, and exact specification.

My invention relates to abrasive implements and more particularly to an abrasive stone adapted for sharpening cutting instruments requiring fine edges.

Oilstones and similar sharpening stones have heretofore been made from short lived materials of low cutting characteristics. The ordinary oilstone comprises abrasive grains bonded by vitrified clay materials, which stone has been immersed in oil and requires the use of further oil to remove the dust and particles ground from the knife blade and otherwise serve as an external lubricating agent. Such oilstones must be porous in order to hold the oil and so have large open spaces capable of loading with dirt and metal. Furthermore, the oil dries up or oxidizes on the surface of the stone and so interferes with sharpening operations. It has also been found that the oil tends to get upon the surface of surgical instruments which are being sharpened, and so prevent proper sterilization afterwards.

It is accordingly an object of my invention to overcome these difficulties and to permit the use of the durable, fast cutting artificial abrasives in a sharpening stone adapted to produce an exceptionally smooth edge on a fine instrument and to provide a suitable filler within the body of the stone which will obviate the necessity for using oil or other lubricating compounds and will prevent too rapid abrasion of a knife and consequent breaking of the cutting edge.

With this and other objects in view as will be apparent from the following disclosure, my invention resides in the composition of matter and the steps of the process herein set forth and covered by the appended claims.

In the course of my experimentation, I have discovered that a satisfactory sharpening stone may be made of fast cutting abrasives by incorporating therein finely divided graphite as a filler which will not scratch or otherwise injuriously affect the knife edge. For the abrasive grains, the various natural and artificial materials, such as corundum, emery, electrically fused or crystalline alumina, silicon carbide, etc. may be used, although I prefer to use a carefully selected brand and grade of crystalline alumina.

In order to bind together the abrasive and graphite I utilize a non-abrasive bond, which is preferably an organic binder incapable of injuriously affecting the knife edge. A serviceable cool cutting, organic bond may be one of the natural resins such as shellac or equivalent synthetic products, such as bakelite, or celluloid, casein, the artificial and natural rubbers, or various vulcanized products, such as linseed oil and sulphur. Of these organic bonds, I prefer to utilize shellac as the main ingredient, although various other organic or inorganic materials adapted to supplement the adhesive qualities of the resin may be added thereto.

As a specific example of one embodiment of my invention, a stone well adapted for sharpening razors, surgical instruments, etc., may be made up with two abrading sides, one preferably comprising abrasive grain and binder alone, and the other comprising a mixture of abrasive grain, graphite and binder. A satisfactory composition for such a stone may be of the following proportions. For the coarse side:

By weight.
Crystalline alumina grain___ 80%
Shellac _____ 20%

For the fine side:
Crystalline alumina grain____ 65%
Graphite _____ 10%
Shellac _____ 25%

This stone may be made according to the following procedure. The alumina, which may contain various impurities is preferably obtained by electrically fusing beauxite and permitting it to cool under crystallizing conditions. This material is ground to a fine powder and then mixed with the graphite and shellac in proper proportions for making the finished article. This mixture is then ground, preferably in a ball mill, to reduce the abrasive to a still finer powder and to obtain an intimate mixture of the separate components. For the coarse side of the stone, I grind and mix the materials for at least four hours, and for the finer side I carry on the operation for several times as long, depending upon the type of stone desired. The finely ground mixtures may then be suitably classified to obtain grains of desired size. It is ordinarily sufficient to sift the material through silk cloth of the finest obtainable mesh, this operation being mainly for the purpose of removing any large particles which may have accidentally fallen into the mixture. For finer grades of stone, I may utilize hydraulic methods of classification.

To make a sharpening stone having both a coarse and a fine side, I fill a mold approximately half full with the coarse material and smooth down by hand pressure to a level surface, after which the fine material is added and smoothed evenly and a cover placed thereover. The mold is then subjected to a temperature of from 350° F. to 375° F. for a suitable length of time, such as two hours, depending upon the size of the stone being formed, in order to melt the shellac and make it adhere to the abrasive and graphite. This mass is then subjected to high pressure such as one ton to the square inch in a cold press but while still retaining the residual heat from the preliminary heating operation. After cooling the mold, the article is removed therefrom and baked at a suitable temperature such as 400° F. for a sufficient length of time to drive off the volatile ingredients of the shellac or to set it. In order to finish the stone it may be polished with suitable arbrasives.

It is obvious that the quantity and the grain size of the abrasive may be varied within wide limits, depending upon whether one wishes a fast or a slow cutting action. The function of the graphite may be that of a lubricant or that of an inert filler, its noticeable effect being to modify the fast cutting action of sharp abrasives and produce a fine edge. The graphite may be increased or decreased as desired to regulate the number of available abrasive grains in the surface of the stone, an increase tending to reduce the sharpening qualities thereof. I preferably limit the graphite to less than 15% by weight, but for some uses I may add a greater amount to the coarse side of the stone. The shellac may be incorporated with the mixture in proportions varying preferably from 5% to 30% by weight of the total amount, the lesser amounts giving the softer bond. It also is obvious that this composition of matter may be used for various abrading, polishing and grinding purposes and that the stone may be made up into wheel form or in any desired shape. It is to be understood that the term "bond" is used in the claims in its commonly accepted meaning and is intended to cover such materials as are understood by one skilled in the abrasive art to be useful for bonding abrasive grains into a heterogenous or conglomerate mass, in which the exceedingly hard abrasive grains are held together by softer and more brittle or more wearable material capable of permitting a grain to become dislodged from its setting before it becomes dulled and useless as an abradant.

Having thus described my invention what I claim and desire to secure by Letters Patent is:

1. An abrasive stone comprising fast cutting abrasive grains, a filler of graphite intermixed therewith and a bond uniting the same as a heterogenous mass.

2. An abrasive stone for sharpening fine edges comprising fast cutting, abrasive grains, finely divided graphite intimately mixed therewith and a heat set, resinous bond uniting the grains and graphite into a dense, self-lubricating mass.

3. An abrasive stone comprising graphite and crystalline abrasive grains bonded together by a heat set resin varying from 5% to 30% by weight of the total mass.

4. An abrasive stone comprising an intimate mixture of crystalline alumina grains, graphite in amount not exceeding 15% by weight and not over 30% by weight of heat set shallac.

5. A non-vitrified abrasive stone comprising finely divided abrasive grains intermixed with powdered graphite and a heat set organic bonding material uniting the same, said ingredients being proportioned to form a dense, cool, cutting mass capable of sharpening fine edges.

Signed at Worcester, Massachusetts, this 20th day of Feb., 1919.

JULES H. STEAN.